(12) United States Patent
Zeng

(10) Patent No.: US 11,893,830 B2
(45) Date of Patent: Feb. 6, 2024

(54) METHOD AND APPARATUS FOR CONNECTING THROUGH ON-VEHICLE BLUETOOTH, AND STORAGE MEDIUM

(71) Applicant: APOLLO INTELLIGENT CONNECTIVITY (BEIJING) TECHNOLOGY CO., LTD., Beijing (CN)

(72) Inventor: Fanguang Zeng, Beijing (CN)

(73) Assignee: APOLLO INTELLIGENT CONNECTIVITY (BEIJING) TECHNOLOGY CO., LTD., Beijing (CN)

(\*) Notice: Subject to any disclaimer, the term of this patent is extended or adjusted under 35 U.S.C. 154(b) by 0 days.

(21) Appl. No.: 17/805,919

(22) Filed: Jun. 8, 2022

(65) Prior Publication Data
US 2022/0301343 A1    Sep. 22, 2022

(30) Foreign Application Priority Data
Jun. 11, 2021  (CN) .......................... 202110658016.1

(51) Int. Cl.
*G06V 40/16*    (2022.01)
*G06T 7/80*    (2017.01)
(Continued)

(52) U.S. Cl.
CPC .............. *G06V 40/172* (2022.01); *G06T 7/80* (2017.01); *G06V 20/59* (2022.01); *H04W 4/40* (2018.02);
(Continued)

(58) Field of Classification Search
CPC .. G06V 40/172; G06V 20/59; G06V 382/118; G06T 7/80; H04W 4/80; H04W 4/40
See application file for complete search history.

(56) References Cited

U.S. PATENT DOCUMENTS 10,491,734 B1 * 11/2019 Annasagaram Krishnamurthy .... H04W 12/50
2015/0197205 A1 * 7/2015 Xiong ................... B60R 16/037 701/49
(Continued)

FOREIGN PATENT DOCUMENTS

CN    110896568 A    3/2020
CN    111510886 A    8/2020
(Continued)

OTHER PUBLICATIONS

Extended European Search Report issued in EP Application No. 22177044.9 dated Oct. 31, 2022 (7 pages).
(Continued)

*Primary Examiner* — David Bilodeau
(74) *Attorney, Agent, or Firm* — Osha Bergman Watanabe & Burton LLP

(57) ABSTRACT

A method and an apparatus for connecting through on-vehicle Bluetooth, and a storage medium includes: acquiring a first face image of a driver in response to an on-vehicle Bluetooth apparatus being on; determining a first face identifier corresponding to the driver by performing face recognition on the first face image; querying a first correspondence according to the first face identifier, in which the first correspondence indicates a correspondence between face identifiers and Bluetooth identifiers of terminals; in response to determining a first Bluetooth identifier matching the first face identifier, establishing, according to the first Bluetooth identifier, a Bluetooth connection between the on-vehicle Bluetooth apparatus and a first terminal Bluetooth apparatus corresponding to the first Bluetooth identifier.

17 Claims, 3 Drawing Sheets

(51) Int. Cl.
  *H04W 4/80* (2018.01)
  *H04W 4/40* (2018.01)
  *G06V 20/59* (2022.01)

(52) U.S. Cl.
  CPC ..... *H04W 4/80* (2018.02); *G06T 2207/30201* (2013.01); *G06T 2207/30268* (2013.01)

(56) References Cited

U.S. PATENT DOCUMENTS

| | | | | |
|---|---|---|---|---|
| 2018/0253094 | A1* | 9/2018 | Chang | G05D 1/0055 |
| 2018/0312168 | A1 | 11/2018 | Li | |
| 2020/0154497 | A1 | 5/2020 | Kim et al. | |
| 2020/0193197 | A1* | 6/2020 | Matsuo | G05D 1/0061 |
| 2020/0216077 | A1* | 7/2020 | Nölscher | H04L 67/306 |
| 2020/0349345 | A1* | 11/2020 | Hodge | G06Q 30/08 |
| 2022/0330029 | A1* | 10/2022 | Wang | H04W 12/108 |

FOREIGN PATENT DOCUMENTS

| | | |
|---|---|---|
| CN | 112686076 A | 4/2021 |
| JP | 2008042577 A | 2/2008 |
| JP | 2010113494 A | 5/2010 |
| JP | 2015023346 A | 2/2015 |
| JP | 2019200818 A | 11/2019 |
| KR | 10-2016-0080169 A | 7/2016 |

OTHER PUBLICATIONS

Zhang Jing et al.; "Smartphone camera system based on Bluetooth technology and face recognition technology;" College of Literature and Economics, Yantai University, Yantai, Shandong; Yantai Yundu Haiying UAV Application Technology Co., Ltd. Yantai Shandong, No. 22; 2018; with English translation (6 pages).

Office Action issued in Chinese Application No. 202110658016.1, dated May 6, 2022, with English translation (19 pages).

Office Action issued for Japanese patent application 2022-091744, dated Jun. 27, 2023 (10 pages).

Korean Office Action issued in Korean Application No. 10-2022-0068105 dated Sep. 19, 2023 (16 pages).

* cited by examiner

METHOD AND APPARATUS FOR CONNECTING THROUGH ON-VEHICLE BLUETOOTH, AND STORAGE MEDIUM

CROSS REFERENCE TO RELATED APPLICATION

This application is based on and claims priority to Chinese Patent Application No. 202110658016.1, filed on Jun. 11, 2021, the entire content of which is hereby incorporated by reference.

TECHNICAL FIELD

The disclosure relates to a field of Internet of vehicles technologies, and more particular to, a field of intelligent transportation technologies.

BACKGROUND

During driving a vehicle, hands-free communication is generally performed through Bluetooth technology in order to free both hands and reduce a hidden risk in causing traffic trouble.

SUMMARY

Embodiments of the disclosure provide a method and an apparatus for connecting through on-vehicle Bluetooth, and a storage medium.

According to a first aspect of the disclosure provide, there is provided a method for connecting through on-vehicle Bluetooth. The method includes:
- acquiring a first face image of a driver in response to an on-vehicle Bluetooth apparatus being on;
- determining a first face identifier corresponding to the driver by performing face recognition on the first face image;
- querying a first correspondence according to the first face identifier, in which the first correspondence indicates a correspondence between face identifiers and Bluetooth identifiers of terminals;
- in response to determining a first Bluetooth identifier matching the first face identifier, establishing, according to the first Bluetooth identifier, a Bluetooth connection between the on-vehicle Bluetooth apparatus and a first terminal Bluetooth apparatus corresponding to the first Bluetooth identifier.

According to a second aspect of the disclosure provide, there is provided an apparatus for connecting through on-vehicle Bluetooth. The apparatus includes: at least one processor; and a memory connected in communication with the at least one processor. The memory stores instructions executable by the at least one processor, when the instructions are executed by the at least one processor, the at least one processor is configured to:
- acquire a first face image of a driver in response to an on-vehicle Bluetooth apparatus being on;
- determine a first face identifier corresponding to the driver by performing face recognition on the first face image;
- query a first correspondence according to the first face identifier, in which the first correspondence indicates a correspondence between face identifiers and Bluetooth identifiers of terminals;
- in response to determining a first Bluetooth identifier matching the first face identifier, establish, according to the first Bluetooth identifier, a Bluetooth connection between the on-vehicle Bluetooth apparatus and a first terminal Bluetooth apparatus corresponding to the first Bluetooth identifier.

According to a third aspect of the disclosure provide, there is provided a non-transitory computer-readable storage medium storing computer instructions. When the computer instructions are executed, the computer is caused to implement a method for connecting through on-vehicle Bluetooth. The method includes:
- acquiring a first face image of a driver in response to an on-vehicle Bluetooth apparatus being on;
- determining a first face identifier corresponding to the driver by performing face recognition on the first face image;
- querying a first correspondence according to the first face identifier, in which the first correspondence indicates a correspondence between face identifiers and Bluetooth identifiers of terminals;
- in response to determining a first Bluetooth identifier matching the first face identifier, establishing, according to the first Bluetooth identifier, a Bluetooth connection between the on-vehicle Bluetooth apparatus and a first terminal Bluetooth apparatus corresponding to the first Bluetooth identifier.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

A brief description is made on the technical field of the solution of the present disclosure below.

Internet of vehicles: a concept of the Internet of vehicles originates from Internet of things, that is, the Internet of things for vehicles. The Internet of vehicles takes moving vehicles as an information perception object, and realizes network connection between vehicles and X (i.e., vehicles and vehicles, vehicles and people, vehicles and roads or vehicles and service platforms) through a new generation of information and communication technologies, and improves an overall intelligent driving level of vehicles, and provides users with safe, comfortable, intelligent and efficient driving experience and traffic services, and improves traffic operation efficiency, and an intelligent level of social transportation services.

The Internet of vehicles mainly refers to that an on-board device on the vehicle effectively utilizes all vehicle dynamic information in an information network platform through wireless communication technology, and provides different functional services during vehicle driving. The Internet of vehicles presents the following characteristics: capable of providing guarantee for a distance between vehicles and reducing a probability of vehicle collision accidents; capable of helping vehicle owners in real-time navigate, and improving an efficiency of traffic operation through communication between the Internet of vehicles with other vehicles and network systems.

Intelligent transportation: the intelligent transportation is a technology that effectively and comprehensively applies advanced science and technology (information technology, computer technology, data communication technology, sensor technology, electronic control technology, automatic control theory, operations research, artificial intelligence, etc.) to transportation, service control and vehicle manufacturing, to strengthen a connection among vehicles, roads and users, so as to ensure safety, improve efficiency, improve environment, and save energy.

Figure 1:
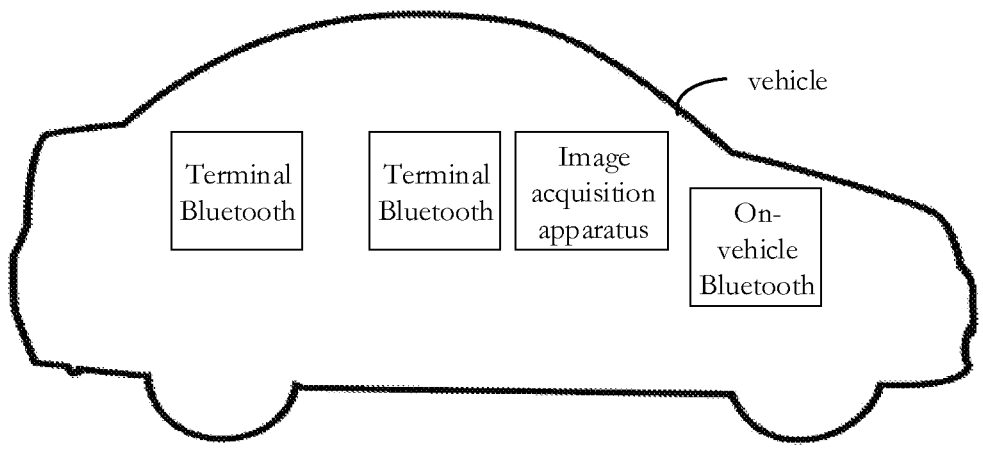
FIG. 1 is a schematic diagram of a vehicle according to an embodiment of the present disclosure.

FIG. 1 is a schematic diagram of a vehicle according to an embodiment of the present disclosure. As shown in FIG. 1, a vehicle in an embodiment of the present disclosure is introduced as follows. The method for connecting through on-vehicle Bluetooth in an embodiment of the present disclosure may be applied to various types of vehicles, such as a car, a sports car, a van and an off-road vehicle. The vehicle is equipped with an image acquisition apparatus and an on-vehicle Bluetooth apparatus. The image acquisition apparatus is configured to collect an interior image of the vehicle. The on-vehicle Bluetooth apparatus is an in-vehicle wireless communication device designed and developed on the basis of wireless Bluetooth technology. During the driving process of the vehicle, users may realize communication with external apparatuses without cables or telephone brackets. For example, the users may make and receive calls or send and receive messages by instant communication software through the on-vehicle Bluetooth.

Figure 2:
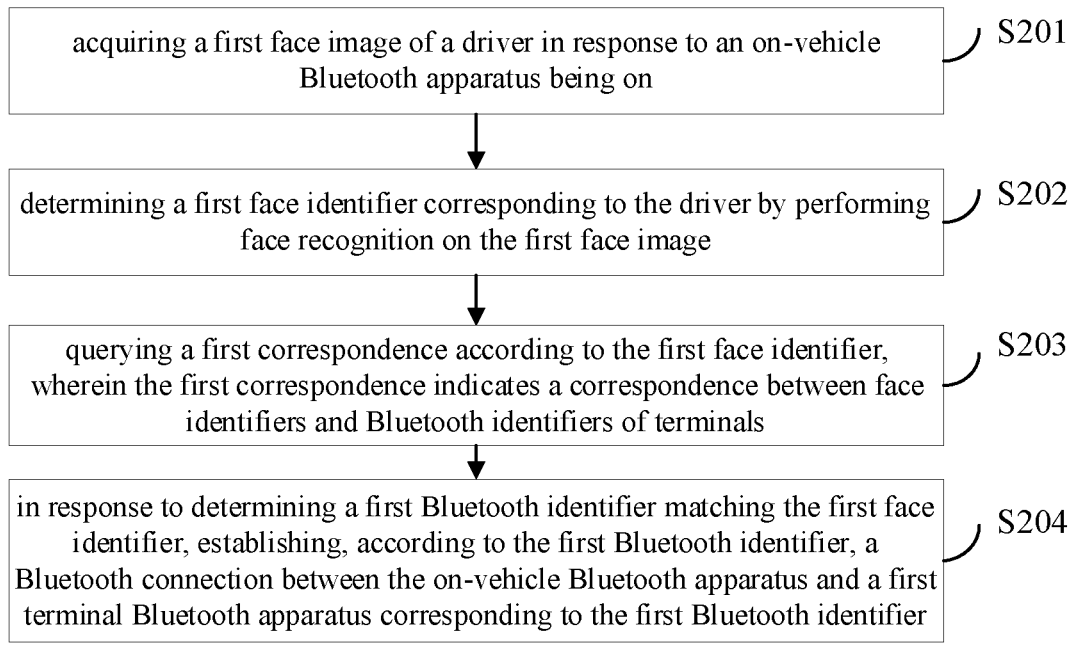
FIG. 2 is a flowchart of a method for connecting through on-vehicle Bluetooth according to an embodiment of the present disclosure.

FIG. 2 is a flowchart of a method for connecting through on-vehicle Bluetooth according to an embodiment of the present disclosure. As illustrated in FIG. 2, the method may include the following blocks.

At blocks S201, a first face image of a driver is acquired in response to an on-vehicle Bluetooth apparatus being on.

In some implementations, after a vehicle is started, the vehicle may directly control the on-vehicle Bluetooth apparatus to automatically turn on and enter a state for searching Bluetooth apparatuses. In some implementations, after the vehicle is started, a user may manually turn on the on-vehicle Bluetooth apparatus, and then the vehicle enters the state for searching Bluetooth apparatuses.

After the on-vehicle Bluetooth apparatus is turned on, an image acquisition apparatus may be started. Image acquisition may be performed on the driver by the image acquisition apparatus to acquire the first face image of the driver. Alternatively, the first face image of the driver may be directly captured. Alternatively, an image of a position where the driver is location may also be captured, and the first face image of the driver may be extracted from the image of the position where the driver is location.

In some implementations, a first interior image of the vehicle may be acquired by the image acquisition apparatus. An area where a seat of the driver is location, referred to as a driving area, is identified from the first interior image, and face detection is performed on an image of the driving area to extract the first face image of the driver.

In some implementations, a current shooting angle of the image acquisition apparatus may be determined. In response to the current shooting angle not covering a driving space, the shooting angle of the image acquisition apparatus may be adjusted towards the driving space, the image of the driving space is acquired. In response to the current shooting angle covering the driving space, the image of the driving space is acquired directly. The face detection may be performed on an image of an area indicated by the driving space, that is, the image of the driving area, and the face image of the driver, that is, the first face image, is extracted.

Alternatively, AdaBoost learning algorithm may be utilized to perform the face detection on the image of the driving area to obtain the first face image.

At blocks S202, a first face identifier corresponding to the driver is determined by performing face recognition on the first face image.

The face recognition is a biometric recognition technology based on facial feature information of people. The facial features in the first face image, that is, the first face identifier corresponding to the driver, may be extracted through the face recognition.

The human face, like other biometric features of the human body (fingerprint, iris, etc.), is innate, and has good characteristics of uniqueness and not easy to be copied. That is to say, the face identifier may be used for identity authentication, and provide a necessary prerequisite for identifying a terminal Bluetooth apparatus of the driver in the present disclosure.

The facial features may be extracted by performing the face recognition on the first face image, and the face identifier of the driver may be obtained based on the facial features. In some implementations, the face identifier is directly the extracted facial feature. In other implementations, a mapping relationship between facial features and face identifiers may be constructed through pre-matching, and the mapping relationship may store identity information of users, and the identity information may be used as the face identifier. The identity information may uniquely identify the user, and the identity may be at least one of a social account, an email address, a mobile phone number, an identity number, and a user name.

In some implementations, for example, the first face image may be affected by conditions such as ambient brightness, and clarity of the first face image may also be limited. Therefore, the first face image may be preprocessed to improve accuracy of face recognition. In an embodiment of the present disclosure, the preprocessing may include one or more of the following: light compensation, grayscale transformation, histogram equalization, normalization, geometric correction, filtering, and sharpening. Alternatively, a preprocessing operation may be performed before the face recognition, or may be performed after the face recognition.

At blocks S203, a first correspondence is queried according to the first face identifier. The first correspondence indicates a correspondence between face identifiers and Bluetooth identifiers of terminals.

There is the correspondence between the face identifiers and the Bluetooth identifiers of terminals. The Bluetooth identifier of the terminal corresponding to the face identifier in the database may be determined According to the correspondence. For example, face identifier 1 corresponds to Bluetooth identifier A, face identifier 2 corresponds to Bluetooth identifier B, and face identifier 3 corresponds to Bluetooth identifier C.

In the embodiment of the present disclosure, after the first face identifier is obtained, the first face identifier is used as a query condition to query the correspondence between the face identifiers and the Bluetooth identifiers of the terminals.

At blocks S204, in response to determining a first Bluetooth identifier matching the first face identifier, a Bluetooth connection between the on-vehicle Bluetooth apparatus and a first terminal Bluetooth apparatus corresponding to the first Bluetooth identifier is establishing according to the first Bluetooth identifier.

When the Bluetooth identifier of the terminal corresponding to the first face identifier is determined according to the first correspondence, that is, the first Bluetooth identifier matching the first face identifier is queried, the Bluetooth connection between the on-vehicle Bluetooth apparatus and the first terminal Bluetooth apparatus corresponding to the first Bluetooth identifier is establishing according to the first Bluetooth identifier.

In some implementations, when the facial features are used as the face identifier, due to changes in hairstyle or makeup at different time points, the identified first face identifier of the driver may have subtle differences with the face identifier of the driver in the correspondence. In an embodiment of the present disclosure, a similarity between the first face identifier and each face identifier in the corresponded is compared, and a target face identifier that satisfies a similarity condition is used as the first face identifier, and a Bluetooth identifier corresponding to the target face identifier in the correspondence is used as the first Bluetooth identifier matching the first face identifier. For example, when the face identifier 2 and the first face identifier satisfy the similarity condition, the Bluetooth identifier B corresponding to the face identifier 2 is used as the first Bluetooth identifier matching the first face identifier. Optionally, the similarity condition may be a preset threshold value, and when the similarity is greater than the preset threshold value, it may be determined that the similarity condition is satisfied.

Optionally, since a device name of the terminal Bluetooth apparatus may be repeated when performing Bluetooth matching, in an embodiment of the present disclosure, the Bluetooth identifier may be unique identification information, such as a media access control (MAC) address. Therefore, the first terminal Bluetooth apparatus corresponding to the first Bluetooth identifier may be determined according to the first correspondence, and a process of connection establishment may be started. After the process of connection establishment may be executed, the connection between the on-vehicle Bluetooth apparatus and the first terminal Bluetooth apparatus may be established, the communication between the on-vehicle Bluetooth apparatus and the first terminal Bluetooth apparatus may be further realized.

In an embodiment of the present disclosure, the first face image of the driver is acquired in response to the on-vehicle Bluetooth apparatus being on. The first face identifier corresponding to the driver is determined by performing the face recognition on the first face image. The first correspondence indicating the correspondence between the face identifiers and the Bluetooth identifiers of terminals is queried according to the first face identifier. In response to determining the first Bluetooth identifier matching the first face identifier, the Bluetooth connection between the on-vehicle Bluetooth apparatus and the first terminal Bluetooth apparatus corresponding to the first Bluetooth identifier is establishing according to the first Bluetooth identifier. In the present disclosure, the on-vehicle Bluetooth apparatus may accurately connect with the terminal Bluetooth apparatus of the driver when the on-vehicle Bluetooth apparatus has been paired with multiple terminal Bluetooth apparatuses already, which may avoid inconvenience caused by the terminal Bluetooth apparatus of a non-driver connecting the on-vehicle Bluetooth apparatus during driving, and improve user experience, driving efficiency and Bluetooth connection efficiency.

In a scenario, in order to allow users to have a better experience, in a case that a time point when the terminal Bluetooth apparatuses is turned on is later than a time point when the on-vehicle Bluetooth apparatus is turned on, after the terminal Bluetooth apparatus is turned on, the on-vehicle Bluetooth apparatus may also be automatically connected with the terminal Bluetooth apparatus. The following further describes the method for connecting through on-vehicle Bluetooth according to an embodiment of the present disclosure for this scenario.

Figure 3:
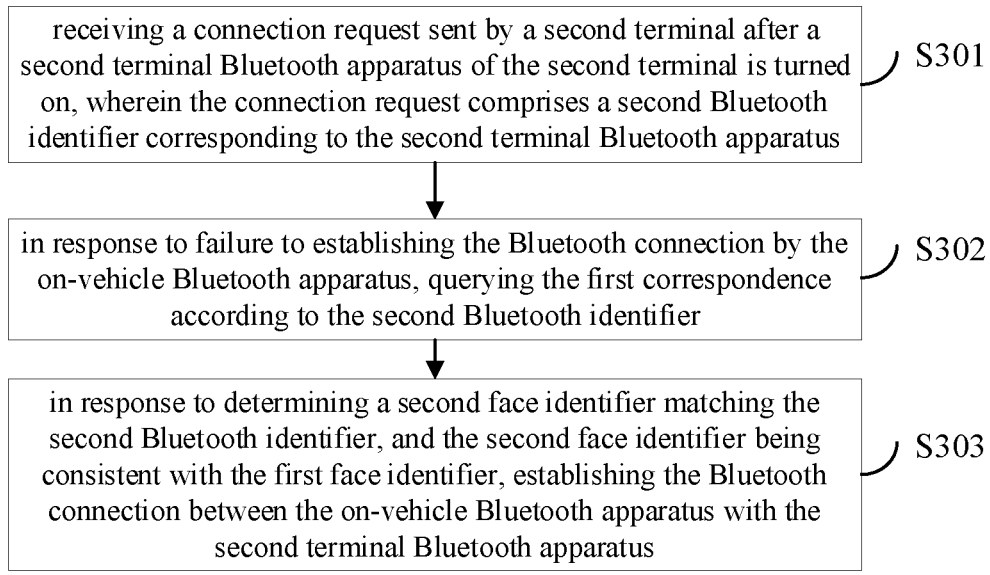
FIG. 3 is a flowchart of a method for connecting through on-vehicle Bluetooth according to an embodiment of the present disclosure.

FIG. 3 is a flowchart of a method for connecting through on-vehicle Bluetooth according to an embodiment of the present disclosure. As illustrated in FIG. 3, on the basis of the above embodiment, the method further includes the following blocks.

At blocks S301, a connection request sent by a second terminal after a second terminal Bluetooth apparatus of the second terminal is turned on is received. The connection request includes a second Bluetooth identifier corresponding to the second terminal Bluetooth apparatus.

After the second terminal Bluetooth apparatus is turned on, the second terminal sends the connection request to the on-vehicle Bluetooth apparatus. The connection request includes the second Bluetooth identifier corresponding to the second terminal Bluetooth apparatus.

At blocks S302, in response to failure to establishing the Bluetooth connection by the on-vehicle Bluetooth apparatus, the first correspondence is queried according to the second Bluetooth identifier.

When the on-vehicle Bluetooth apparatus does not establish the connection with the terminal Bluetooth apparatus, the correspondence is acquired according to the second Bluetooth identifier in the connection request, and it is determined whether the second face identifier matching the second Bluetooth identifier is queried.

At blocks S303, in response to determining a second face identifier matching the second Bluetooth identifier, and the second face identifier being consistent with the first face identifier, the Bluetooth connection between the on-vehicle Bluetooth apparatus with the second terminal Bluetooth apparatus is established.

In an embodiment of the present disclosure, when the on-vehicle Bluetooth apparatus and the terminal Bluetooth apparatus are successfully paired for the first time, the association between the face identifier and the Bluetooth identifier is established, and then added the association to the correspondence. Therefore, when the second face identifier matches the second Bluetooth identifier is queried, it is indicated that the second terminal Bluetooth apparatus corresponding to the second Bluetooth identifier has been paired with the on-vehicle Bluetooth apparatus.

The second terminal may be the first terminal corresponding to the driver, or terminals corresponding to other personnel in the vehicle. Therefore, in order to prevent the terminals corresponding to other personnel in the vehicle from accessing the on-vehicle Bluetooth apparatus, the second terminal Bluetooth apparatus is queried. After identifying the matching second face identifier, it is further determined whether the second face identifier is consistent with the first face identifier. When the second face identifier is consistent with the first face identifier, it indicates that the terminal Bluetooth apparatus corresponding to the second Bluetooth identifier corresponds to the driver in the current vehicle, and the Bluetooth connection between the on-vehicle Bluetooth apparatus and the second terminal Bluetooth apparatus is established.

In some implementations, in response to failure to determining the second face identifier, that is, the second terminal Bluetooth apparatus and the on-vehicle Bluetooth apparatus are not paired, the connection request is refused to be executed.

In some implementations, in response to the second face identifier being inconsistent with the first face identifier, that is, the second terminal Bluetooth does not belong to the driver, the connection request is refused to be executed.

In some implementations, in response to failure to determining the second face identifier and the second face identifier being inconsistent with the first face identifier, that is, the second terminal Bluetooth apparatus and the on-vehicle Bluetooth apparatus are not paired and the second terminal Bluetooth does not belong to the driver, the connection request is refused to be executed.

In this embodiment of the present disclosure, the connection request sent by the second terminal after the second terminal Bluetooth apparatus of the second terminal is turned on is received. The connection request includes the second Bluetooth identifier corresponding to the second terminal Bluetooth apparatus. In response to failure to establishing the Bluetooth connection by the on-vehicle Bluetooth apparatus, the first correspondence is queried according to the second Bluetooth identifier. In response to determining the second face identifier matching the second Bluetooth identifier, and the second face identifier being consistent with the first face identifier, the Bluetooth connection between the on-vehicle Bluetooth apparatus with the second terminal Bluetooth apparatus is established. In the present disclosure, the on-vehicle Bluetooth apparatus may accurately connect with the terminal Bluetooth apparatus of the driver when the on-vehicle Bluetooth apparatus has been paired with multiple terminal Bluetooth apparatuses already, which may avoid inconvenience caused by the terminal Bluetooth apparatus of a non-driver connecting the on-vehicle Bluetooth apparatus during driving, and improve user experience, driving efficiency and Bluetooth connection efficiency.

Figure 4:
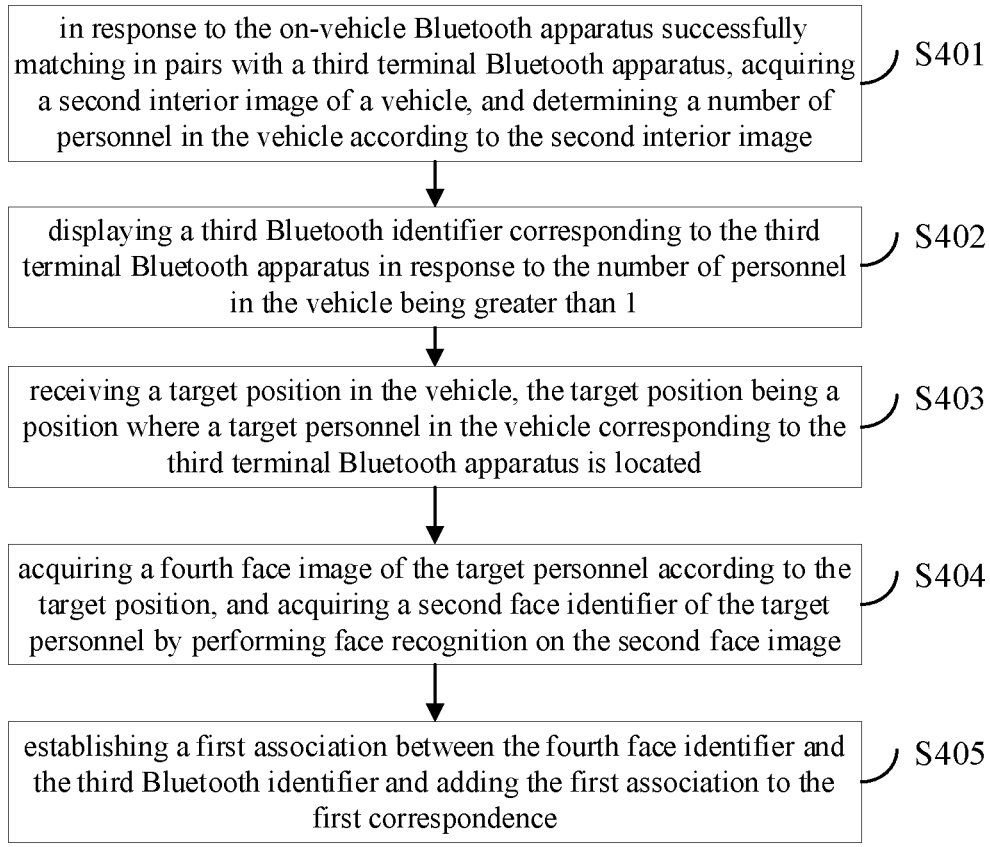
FIG. 4 is a flowchart of a method for connecting through on-vehicle Bluetooth according to an embodiment of the present disclosure.

In order to improve efficiency of the connection through on-vehicle Bluetooth, when the on-vehicle Bluetooth apparatus and the terminal Bluetooth apparatus are successfully paired for the first time, the correspondence between the face identifier and the Bluetooth identifier is established and stored in the database for subsequent query. FIG. 4 is a flowchart of a method for connecting through on-vehicle Bluetooth according to an embodiment of the present disclosure. As illustrated in FIG. 4, on the basis of the above embodiment, the method further includes the following blocks.

At block S401, in response to the on-vehicle Bluetooth apparatus successfully matching in pairs with a third terminal Bluetooth apparatus, a second interior image of a vehicle is acquired, and a number of personnel in the vehicle is determined according to the second interior image.

After the on-vehicle Bluetooth apparatus is successfully paired with the third terminal Bluetooth apparatus, the second interior image of the vehicle is acquired by the image acquisition apparatus, and the second interior image of the vehicle is identified to determine the number of the personnel in the vehicle.

Optionally, in order to accurately identify the number of the personnel in the vehicle, the second interior image of the vehicle may contain as much as possible the interior overall view of the vehicle. Therefore, a shooting angle of the image acquisition apparatus may be adjusted to a center line between a driver seat and a front passenger-side seat.

Optionally, in order to accurately identify the number of the personnel in the vehicle, the second interior image of the vehicle may be acquired and identified multiple times, and a candidate number of the personnel in the vehicle in each second interior image of the vehicle may be acquired. A mode index of the candidate numbers is taken as the number of the personnel in the vehicle. For example, when the second interior image of the vehicle is acquired five times and identified, the candidate numbers of the personnel in the vehicle identified by the five second interior images of the vehicle are 2, 3, 3, 2, and 3, respectively. The mode of the candidate numbers, that is, 3, is used as the number of the personnel in the vehicle.

Optionally, the second interior image of the vehicle may be processed using semantic segmentation to identify the number of the personnel in the vehicle.

At block S402, a third Bluetooth identifier corresponding to the third terminal Bluetooth apparatus is displayed in response to the number of personnel in the vehicle being greater than 1.

When the number of the personnel in the vehicle is greater than 1, the personnel corresponding to the third terminal Bluetooth apparatus is uncertain. Therefore, the target personnel in the vehicle corresponding to the third terminal Bluetooth is determined, so as to obtain the face identifier of the target personnel in the vehicle, and establishes the correspondence with the Bluetooth identifier of the third terminal Bluetooth apparatus.

In some implementations, a center console has a touch screen and/or a display screen, which may display the third Bluetooth identifier corresponding to the third terminal Bluetooth apparatus to the user. In other implementations, the third Bluetooth identifier of the third terminal Bluetooth apparatus may also be displayed to the user through speech playing.

At block S403, a target position in the vehicle is received. The target position is a position where a target personnel in the vehicle corresponding to the third terminal Bluetooth apparatus is located.

For example, the server may receive the target position in the vehicle where the target personnel in the vehicle corresponding to the third terminal Bluetooth apparatus is located, which is input by the user. For example, a manner in which the user inputs a dialogue includes, but is not limited to, a touch input (such as sliding, clicking, etc.), a keyboard input, a speech input, and the like.

At block S404, a second face image of the target personnel is acquired according to the target position, and a fourth face identifier of the target personnel is acquired by performing face recognition on the second face image;

In some implementations, an image area corresponding to the target position in the vehicle is identified from the captured second interior image of the vehicle, and the second face image is directly intercepted from the image area corresponding to the target position in the vehicle.

In some implementations, the second face image of the target personnel in the vehicle may be directly acquired according to the target position in the vehicle. For example, the current shooting angle of the image acquisition apparatus is acquired, and in response to the current shooting angle not covering a target interior space of the vehicle, the shooting angle of the image acquisition apparatus is adjusted towards the target interior space of the vehicle, and image acquisition is performed on the target interior space of the vehicle to the acquisition of the second face image.

Further, face recognition is performed on the second face image to obtain the fourth face identifier of the target personnel in the vehicle.

It should be noted that the aforementioned method for acquiring the first face identifier and the introduction of the first face identifier are also applicable to acquiring the fourth face identifier in block S404, which will not be repeated herein.

At block S405, a first association between the fourth face identifier and the third Bluetooth identifier is established and the first association is added to the first correspondence.

The association between the fourth face identifier and the third Bluetooth identifier is established and the association is added to the first correspondence and stored in a database for subsequent query. That is, whenever there is an association between the face identifier and the Bluetooth identifier, it is added to the correspondence, so as to realize continuous updating of the correspondence and better support the subsequent query of the correspondence.

In some implementations, in response to the number of personnel in the vehicle being 1, it indicates that the current personnel in the vehicle is the target personnel in the vehicle, and the third terminal Bluetooth apparatus corresponding to the third Bluetooth identifier belongs to the personnel in the vehicle. A third face image of the personnel in the vehicle is acquired, and a third face identifier of the personnel in the acquired by performing the face recognition on the third face image. A second association between the third face identifier and the third Bluetooth identifier is established and the second association is added to the first correspondence.

It should be noted that the aforementioned for acquiring the second face image and the introduction of the first face identifier are also applicable to the acquisition of the third face image in block S405, and will not be repeated herein.

The embodiments of the present disclosure may realize continuous updating of correspondence, and better support the query of subsequent correspondence relationships, thereby improving user experience and improving Bluetooth connection efficiency and driving efficiency.

Figure 5:
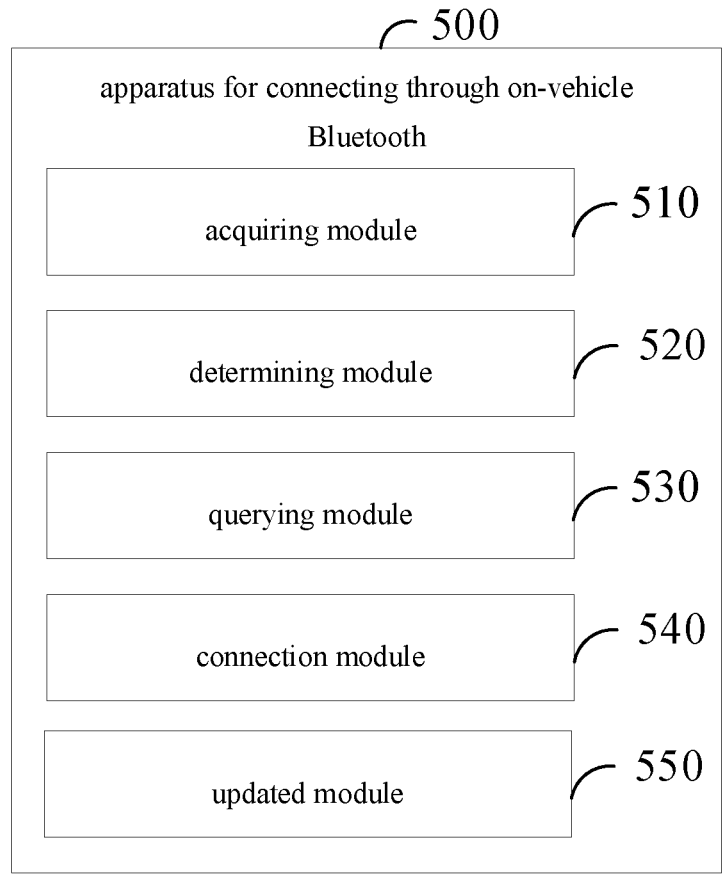
FIG. 5 is a block diagram of an apparatus for connecting through on-vehicle Bluetooth according to an embodiment of the present disclosure.

FIG. 5 is a block diagram of an apparatus for connecting through on-vehicle Bluetooth according to an embodiment of the present disclosure. As illustrated in FIG. 5, the apparatus 500 includes:

an acquiring module 510, configured to acquire a first face image of a driver in response to an on-vehicle Bluetooth apparatus being on;

a determining module 520, configured to determine a first face identifier corresponding to the driver by performing face recognition on the first face image;

a querying module 530, configured to query a first correspondence according to the first face identifier, in which the first correspondence indicates a correspondence between face identifiers and Bluetooth identifiers of terminals;

a connection module 540, configured to, in response to determining a first Bluetooth identifier matching the first face identifier, establish, according to the first Bluetooth identifier, a Bluetooth connection between the on-vehicle Bluetooth apparatus and a first terminal Bluetooth apparatus corresponding to the first Bluetooth identifier.

According to the present disclosure, the on-vehicle Bluetooth apparatus may accurately connect with the terminal Bluetooth apparatus of the driver when the on-vehicle Bluetooth apparatus has been paired with multiple terminal Bluetooth apparatuses already, which may avoid inconvenience caused by the terminal Bluetooth apparatus of a non-driver connecting the on-vehicle Bluetooth apparatus during driving, and improve user experience, driving efficiency and Bluetooth connection efficiency.

It should be noted that the above explanation for embodiments of the method for connecting through on-vehicle Bluetooth is also applicable to embodiments of the apparatus for connecting through on-vehicle Bluetooth, and will not be repeated herein.

Further, in a possible implementation of the present disclosure, the connection module 540 is further configured to: receive a connection request sent by a second terminal after a second terminal Bluetooth apparatus of the second terminal is turned on, wherein the connection request comprises a second Bluetooth identifier corresponding to the second terminal Bluetooth apparatus; in response to failure to establishing the Bluetooth connection by the on-vehicle Bluetooth apparatus, query the first correspondence according to the second Bluetooth identifier; and in response to determining a second face identifier matching the second Bluetooth identifier, and the second face identifier being consistent with the first face identifier, establish the Bluetooth connection between the on-vehicle Bluetooth apparatus with the second terminal Bluetooth apparatus.

In a possible implementation of the present disclosure, the connection module 540 is further configured to: in response to at least one of failure to determining the second face identifier and the second face identifier being inconsistent with the first face identifier, reject the connection request.

In a possible implementation of the present disclosure, the acquiring module 510 is configured to: acquire a first interior image of a vehicle; determine a driving area in the first interior image; and extract the first face image from the driving area.

In a possible implementation of the present disclosure, the acquiring module 510 is configured to: acquire a current shooting angle of an image acquisition apparatus; in response to the current shooting angle not covering a driving space, adjust the shooting angle of the image acquisition apparatus towards the driving space, and acquire the first face image by capturing an image of the driving space.

In a possible implementation of the present disclosure, the apparatus further includes an updated module 550. The updated module 550 is configured to: in response to the on-vehicle Bluetooth apparatus successfully matching in pairs with a third terminal Bluetooth apparatus, acquire a second interior image of a vehicle, and determining a number of personnel in the vehicle according to the second interior image; display a third Bluetooth identifier corresponding to the third terminal Bluetooth apparatus in response to the number of personnel in the vehicle being greater than 1; receive a target position in the vehicle, the target position being a position where a target personnel in the vehicle corresponding to the third terminal Bluetooth apparatus is located; acquire a second face image of the target personnel according to the target position, and acquire a fourth face identifier of the target personnel by performing face recognition on the second face image; establish a first association between the fourth face identifier and the third Bluetooth identifier and add the first association to the first correspondence.

In a possible implementation of the present disclosure, the updated module 550 is configured to: in response to the number of personnel in the vehicle being 1, acquire a third face image of the personnel in the vehicle, acquire a third face identifier of the personnel by performing face recognition on the third face image; establish a second association between the third face identifier and the third Bluetooth identifier and add the second association to the first correspondence.

According to the embodiments of the disclosure, the embodiments of the disclosure provide an electronic device, a readable storage medium and a computer program product.

Figure 6:
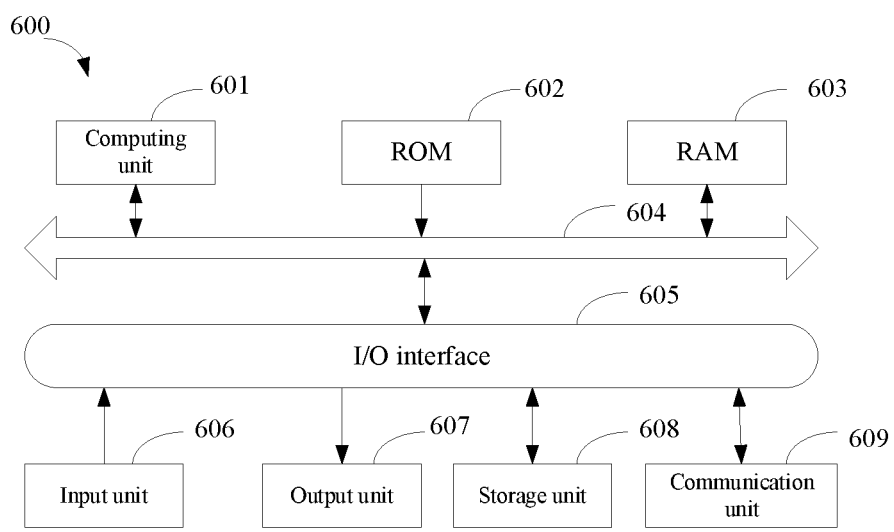
FIG. 6 is a block diagram of an electronic device used to implement a method for connecting through on-vehicle Bluetooth according to embodiments of the present disclosure.

FIG. 6 is a block diagram of an electronic device used to implement a method for connecting through on-vehicle Bluetooth according to embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the electronic device includes: a computing unit 601, which is configured to perform various appropriate actions and processes according to computer programs stored on a Read-Only Memory (ROM) 602 or computer programs loaded on a Random Access Memory (RAM) 603 from a storage unit 608. In the RAM 603, various programs and data required for the operation of the device 600 are stored. The computing unit 601, the ROM 602, and the RAM 603 are connected to each other through a bus 604. An Input/output (I/O) interface 605 is connected to the bus 604.

Components in the device 600 are connected to the I/O interface 605, including: an input unit 606, such as a keyboard, a mouse; an output unit 607, such as various types of displays, speakers; a storage unit 608, such as a disk, an optical disk; and a communication unit 609, such as network cards, modems, wireless communication transceivers, and the like. The communication unit 609 allows the device 600 to exchange information/data with other devices through a computer network such as the Internet and/or various telecommunication networks.

The computing unit 601 may be various general and/or dedicated processing components having processing and computing capabilities. Some examples of the computing unit 601 include, but are not limited to, a central processing unit (CPU), a graphics processing unit (GPU), various dedicated artificial intelligence (AI) computing chips, various computing units running machine learning model algorithms, and digital signal processor (DSP), and any suitable processor, controller, and microcontroller. The computing unit 601 performs various methods and processes described above, such as the method for connecting through on-vehicle Bluetooth. For example, in some embodiments, the method for connecting through on-vehicle Bluetooth may be implemented as computer software programs that are tangibly embodied on a machine-readable medium, such as the storage unit 608. In some embodiments, part or all of the computer program may be loaded and/or installed on the device 600 via the ROM 602 and/or the communication unit 609. When a computer program is loaded into the RAM 603 and executed by the computing unit 601, one or more steps of the method for connecting through on-vehicle Bluetooth described above may be performed. Alternatively, in other embodiments, the computing unit 601 may be configured to perform the method in any other suitable manner (e.g., by means of firmware).

Various implementations of the systems and techniques described above may be implemented by Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

Program code for implementing the method of the disclosure may be written in any combination of one or more programming languages. These program codes may be provided to a processor or controller of a general computer, a dedicated computer, or other programmable data processing device, such that the program codes, when executed by the processor or controller, cause the functions and/or operations specified in the flowcharts and/or block diagrams is performed. The program code can be executed entirely on the machine, partly on the machine, as a stand-alone software package partly on a machine and partly on a remote machine or entirely on a remote machine or server.

In the context of the disclosure, a machine-readable medium may be a tangible medium that may contain or store a program for use by or in connection with an instruction execution sys tem, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and block-chain network.

The computer system may include a client and a server. The client and server are generally remote from each other and interacting through a communication network. The client-server relation is generated by computer programs running on the respective computers and having a client-server relation with each other.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

The invention claimed is:

1. A method for connecting through on-vehicle Bluetooth, comprising:
    acquiring a first face image of a driver in response to an on-vehicle Bluetooth apparatus being on;
    determining a first face identifier corresponding to the driver by performing face recognition on the first face image;
    querying a first correspondence according to the first face identifier, wherein the first correspondence indicates a correspondence between face identifiers and Bluetooth identifiers of terminals;
    in response to determining a first Bluetooth identifier matching the first face identifier, establishing, according to the first Bluetooth identifier, a Bluetooth connection between the on-vehicle Bluetooth apparatus and a first terminal Bluetooth apparatus corresponding to the first Bluetooth identifier;
    receiving a connection request sent by a second terminal after a second terminal Bluetooth apparatus of the second terminal is turned on, wherein the connection request comprises a second Bluetooth identifier corresponding to the second terminal Bluetooth apparatus;
    in response to failure to establishing the Bluetooth connection by the on-vehicle Bluetooth apparatus, querying the first correspondence according to the second Bluetooth identifier; and
    in response to determining a second face identifier matching the second Bluetooth identifier, and the second face identifier being consistent with the first face identifier, establishing the Bluetooth connection between the on-vehicle Bluetooth apparatus with the second terminal Bluetooth apparatus.

2. The method according to claim 1, further comprising:
    in response to at least one of failure to determining the second face identifier and the second face identifier being inconsistent with the first face identifier, rejecting the connection request.

3. The method according to claim 1, wherein acquiring the first face image of the driver comprises:
    acquiring a first interior image of a vehicle;
    determining a driving area in the first interior image; and
    extracting the first face image from the driving area.

4. The method according to claim 1, wherein acquiring the first face image of the driver comprises:
    acquiring a current shooting angle of an image acquisition apparatus; and
    in response to the current shooting angle not covering a driving space, adjusting the shooting angle of the image acquisition apparatus towards the driving space, and acquiring the first face image by capturing an image of the driving space.

5. The method according to claim 1, wherein establishing the first correspondence comprises:
    in response to the on-vehicle Bluetooth apparatus successfully matching in pairs with a third terminal Bluetooth apparatus, acquiring a second interior image of a vehicle, and determining a number of personnel in the vehicle according to the second interior image;
    displaying a third Bluetooth identifier corresponding to the third terminal Bluetooth apparatus in response to the number of personnel in the vehicle being greater than 1;
    receiving a target position in the vehicle, the target position being a position where a target personnel in the vehicle corresponding to the third terminal Bluetooth apparatus is located;
    acquiring a second face image of the target personnel according to the target position, and acquiring a fourth face identifier of the target personnel by performing face recognition on the second face image; and
    establishing a first association between the second face identifier and the third Bluetooth identifier and adding the first association to the first correspondence.

6. The method according to claim 5, further comprising:
    in response to the number of personnel in the vehicle being 1, acquiring a third face image of the personnel in the vehicle, acquiring a third face identifier of the personnel by performing face recognition on the third face image; and
    establishing a second association between the third face identifier and the third Bluetooth identifier and adding the second association to the first correspondence.

7. An apparatus for connecting through on-vehicle Bluetooth, comprising:
- at least one processor; and
- a memory connected in communication with the at least one processor; wherein
- the memory stores instructions executable by the at least one processor, when the instructions are executed by the at least one processor, the at least one processor is configured to:
  - acquire a first face image of a driver in response to an on-vehicle Bluetooth apparatus being on;
  - determine a first face identifier corresponding to the driver by performing face recognition on the first face image;
  - query a first correspondence according to the first face identifier, wherein the first correspondence indicates a correspondence between face identifiers and Bluetooth identifiers of terminals; and
  - in response to determining a first Bluetooth identifier matching the first face identifier, establish, according to the first Bluetooth identifier, a Bluetooth connection between the on-vehicle Bluetooth apparatus and a first terminal Bluetooth apparatus corresponding to the first Bluetooth identifier, wherein
- the at least one processor is configured to:
  - receive a connection request sent by a second terminal after a second terminal Bluetooth apparatus of the second terminal is turned on, wherein the connection request comprises a second Bluetooth identifier corresponding to the second terminal Bluetooth apparatus;
  - in response to failure to establishing the Bluetooth connection by the on-vehicle Bluetooth apparatus, query the first correspondence according to the second Bluetooth identifier; and
  - in response to determining a second face identifier matching the second Bluetooth identifier, and the second face identifier being consistent with the first face identifier, establish the Bluetooth connection between the on-vehicle Bluetooth apparatus with the second terminal Bluetooth apparatus.

8. The apparatus according to claim 7, wherein
the at least one processor is configured to:
- in response to at least one of failure to determining the second face identifier and the second face identifier being inconsistent with the first face identifier, reject the connection request.

9. The apparatus according to claim 7, wherein
the at least one processor is configured to:
- acquire a first interior image of a vehicle;
- determine a driving area in the first interior image; and
- extract the first face image from the driving area.

10. The apparatus according to claim 7, wherein
the at least one processor is configured to:
- acquire a current shooting angle of an image acquisition apparatus; and
- in response to the current shooting angle not covering a driving space, adjust the shooting angle of the image acquisition apparatus towards the driving space, and acquire the first face image by capturing an image of the driving space.

11. The apparatus according to claim 7, wherein
the at least one processor is configured to:
- in response to the on-vehicle Bluetooth apparatus successfully matching in pairs with a third terminal Bluetooth apparatus, acquire a second interior image of a vehicle, and determining a number of personnel in the vehicle according to the second interior image;
- display a third Bluetooth identifier corresponding to the third terminal Bluetooth apparatus in response to the number of personnel in the vehicle being greater than 1;
- receive a target position in the vehicle, the target position being a position where a target personnel in the vehicle corresponding to the third terminal Bluetooth apparatus is located;
- acquire a second face image of the target personnel according to the target position, and acquire a fourth face identifier of the target personnel by performing face recognition on the second face image; and
- establish a first association between the fourth face identifier and the third Bluetooth identifier and add the first association to the first correspondence.

12. The apparatus according to claim 11, wherein
the at least one processor is configured to:
- in response to the number of personnel in the vehicle being 1, acquire a third face image of the personnel in the vehicle, acquire a third face identifier of the personnel by performing face recognition on the third face image; and
- establish a second association between the third face identifier and the third Bluetooth identifier and add the second association to the first correspondence.

13. A non-transitory computer-readable storage medium storing computer instructions, wherein when the computer instructions are executed, the computer is caused to implement a method for connecting through on-vehicle Bluetooth, the method comprises:
- acquiring a first face image of a driver in response to an on-vehicle Bluetooth apparatus being on;
- determining a first face identifier corresponding to the driver by performing face recognition on the first face image;
- querying a first correspondence according to the first face identifier, wherein the first correspondence indicates a correspondence between face identifiers and Bluetooth identifiers of terminals;
- in response to determining a first Bluetooth identifier matching the first face identifier, establishing, according to the first Bluetooth identifier, a Bluetooth connection between the on-vehicle Bluetooth apparatus and a first terminal Bluetooth apparatus corresponding to the first Bluetooth identifier;
- receiving a connection request sent by a second terminal after a second terminal Bluetooth apparatus of the second terminal is turned on, wherein the connection request comprises a second Bluetooth identifier corresponding to the second terminal Bluetooth apparatus;
- in response to failure to establishing the Bluetooth connection by the on-vehicle Bluetooth apparatus, querying the first correspondence according to the second Bluetooth identifier; and
- in response to determining a second face identifier matching the second Bluetooth identifier, and the second face identifier being consistent with the first face identifier, establishing the Bluetooth connection between the on-vehicle Bluetooth apparatus with the second terminal Bluetooth apparatus.

14. The storage medium according to claim 13, further comprising:
    in response to at least one of failure to determining the second face identifier and the second face identifier being inconsistent with the first face identifier, rejecting the connection request.

15. The storage medium according to claim 13, wherein acquiring the first face image of the driver comprises:
    acquiring a first interior image of a vehicle;
    determining a driving area in the first interior image; and
    extracting the first face image from the driving area.

16. The storage medium according to claim 13, wherein acquiring the first face image of the driver comprises:
    acquiring a current shooting angle of an image acquisition apparatus; and
    in response to the current shooting angle not covering a driving space, adjusting the shooting angle of the image acquisition apparatus towards the driving space, and acquiring the first face image by capturing an image of the driving space.

17. The storage medium according to claim 13, wherein establishing the first correspondence comprises:
    in response to the on-vehicle Bluetooth apparatus successfully matching in pairs with a third terminal Bluetooth apparatus, acquiring a second interior image of a vehicle, and determining a number of personnel in the vehicle according to the second interior image;
    displaying a third Bluetooth identifier corresponding to the third terminal Bluetooth apparatus in response to the number of personnel in the vehicle being greater than 1;
    receiving a target position in the vehicle, the target position being a position where a target personnel in the vehicle corresponding to the third terminal Bluetooth apparatus is located;
    acquiring a second face image of the target personnel according to the target position, and acquiring a fourth face identifier of the target personnel by performing face recognition on the second face image; and
    establishing a first association between the fourth face identifier and the third Bluetooth identifier and adding the first association to the first correspondence.

* * * * *